United States Patent [19]
Nishihara et al.

[11] Patent Number: 6,026,427
[45] Date of Patent: Feb. 15, 2000

[54] CONDITION VARIABLE TO SYNCHRONIZE HIGH LEVEL COMMUNICATION BETWEEN PROCESSING THREADS

[76] Inventors: Kazunori Nishihara, 211 S. Lucia Ave., #6, Redondo Beach, Calif. 90277; Takaai Hiramatsu, 23825 Anza Ave., #124, Torrance, Calif. 90505

[21] Appl. No.: 08/976,178

[22] Filed: Nov. 21, 1997

[51] Int. Cl.[7] .................................................. G06F 9/46
[52] U.S. Cl. ........................... 709/106; 709/102; 709/107
[58] Field of Search ....................................... 395/672, 673

[56] References Cited

U.S. PATENT DOCUMENTS

| | | |
|---|---|---|
| 4,316,245 | 2/1982 | Luu et al. . |
| 5,515,538 | 5/1996 | Kleiman .................................. 710/260 |
| 5,524,247 | 6/1996 | Mizuno . |
| 5,630,136 | 5/1997 | Davidson et al. . |
| 5,706,515 | 1/1998 | Connelly et al. ........................ 395/676 |
| 5,771,382 | 6/1998 | Wang et al. .............................. 709/100 |
| 5,784,618 | 7/1998 | Toutonghi ................................ 709/107 |
| 5,822,588 | 10/1998 | Sterling et al. .......................... 395/704 |
| 5,853,731 | 12/1998 | Wu et al. .............................. 424/195.1 |

*Primary Examiner*—Majid A. Banankhah
*Attorney, Agent, or Firm*—Oliff & Berridge, PLC

[57] ABSTRACT

The method and apparatus of this invention provide a condition variable that has a time-out capability for an operating system that does not have one. A condition variable allows concurrent programming and provides high level communication between threads. The condition variable allows threads to wait within a mutex and allows broadcast signals to wake up waited threads. The condition variable is implemented by using counters to count the number of waited threads, the number of signals being sent to the waited threads, and semaphore, and means for mutually locking the thread to access the counters.

5 Claims, 11 Drawing Sheets

CONDITION VARIABLE TO SYNCHRONIZE HIGH LEVEL COMMUNICATION BETWEEN PROCESSING THREADS

BACKGROUND OF THE INVENTION

1. Field of Invention

This invention relates to enforcing mutually exclusive access to shared resources in a multitasking computer system. In particular, this invention provides a condition variable to synchronize high level communication between processing threads.

2. Description of Related Art

In modern computer systems, multiple processes are often executed concurrently on one or more processors. The processes often share resources, such as storage devices, input/output devices and memory. When two or more processes need to operate on the same data and memory, or on the same resource, it becomes necessary to provide a mechanism to enforce mutually exclusive access to the resources. Such a mechanism is also required in a single processor system which supports preempted multitasking of processes. In other words, a mechanism is required to allow only one process to have access to a resource at any one time. Furthermore, when two or more processors operating within a computer system require coordination in order to properly complete their operations, a device must be provided to synchronize their processing.

A semaphore is a synchronization mechanism that mediates access to shared resources. A semaphore has an associated value, which is generally set to the number of resources regulated by the semaphore. A binary semaphore has a value of one. When a process has acquired a binary semaphore, it is not possible for any other process to acquire the semaphore until the first process has released the semaphore. When a semaphore has a value greater than one, it is a counting semaphore. A counting semaphore can be acquired by multiple processes. Each time the semaphore is acquired, the value is decremented by one. After the value reaches zero, new attempts to acquire the semaphore are blocked until the semaphore is released by one of the processes. Thus, semaphores are used to guaranty mutual exclusion of shared resources.

A condition variable provides a synchronization mechanism in the same manner as a semaphore does. When one or more first processes wait within the condition variable, the first processes are blocked until a corresponding signal or a broadcast is acquired from a second process to wake the first processes up. When the second process signals the condition variable, one of the first processes blocked within that condition variable is woken up. When the second process broadcasts the condition variable, all the first processes are woken up. If no process is blocked within the condition variable, signaling or broadcasting the condition variable has no affect.

The structured access available with the condition variable makes is easier to correct mutually locking processes. On the other hand, practical systems require time-out functionality for their components, and process synchronization mechanisms have to provide that functionality.

SUMMARY OF THE INVENTION

This invention thus provides a system and method that enables mutual exclusion of asynchronously interacting processes in self-directed distributed systems so that the processors can operate with close to minimum delay. This invention further provides a protocol so that the system can be reliably used in time critical applications. This invention also provides a communication protocol that does not waste computing time by idling the distributed processors. Finally, this invention provides a robust synchronization device for those operating systems that do not have one. The apparatus and method of this invention thus provide condition variables for operating systems that do not have one.

The condition variables allow for mutual exclusion of asynchronously interacting processors in self-directed distributed systems and provide a communication protocol that allow the systems to be used in time-critical applications and that minimizes wasted computing time due to idling processors. The apparatus of this invention includes a system that controls access to a shared resource in a multi-processing computing environment. The method provides time-out capable condition variables, which are similar to semaphores, but are different from semaphores in that the condition variables allow threads to wait within a mutual exclusion (mutex) and allow signals to be broadcast. The condition variables are implemented by using a semaphore and counters to count the number of waited threads and the number of threads signaling to the semaphores.

BRIEF DESCRIPTION OF THE DRAWINGS

The invention is described in detail with reference to the following drawings, wherein like numerals refer to like elements, and wherein.

DETAILED DESCRIPTION OF PREFERRED EMBODIMENTS

Figure 1:
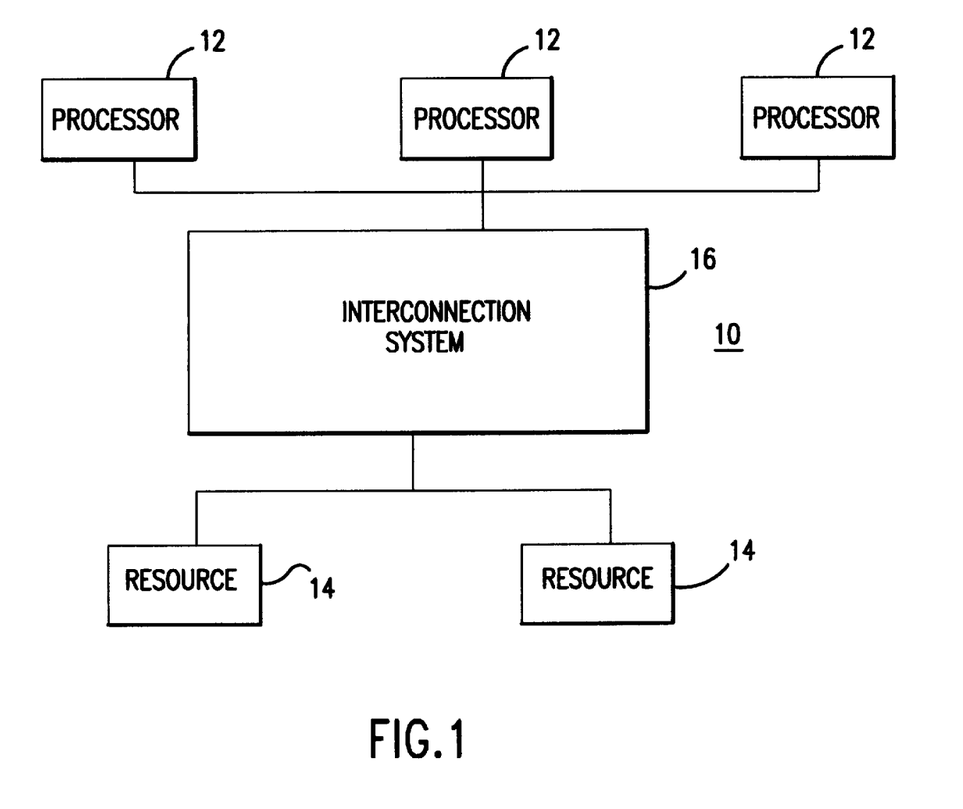
FIG. 1 is a block diagram of a distributed processor system embodying the features of the invention.

FIG. 1 shows a distributed multiprocessing system 10 that includes a number of processors 12 and resources 14 connected through an interconnection system 16. The multiprocessing system 10 can also be a real-time system, a wide-area network, a local-area network, or a network with a primary processor and a plurality of secondary processors, wherein the secondary processors run in a peer-to-peer network among themselves without being monitored by the primary processor. Finally, the multiprocessing system 10 can be a single computer where each processor is a separate processing thread and the separate processing threads require synchronization. The processors 12 can also be individual threads in a distributed computing environment. Basically, any object that either competes for resources, or requires synchronization with another object, can benefit from this invention.

Figure 2:
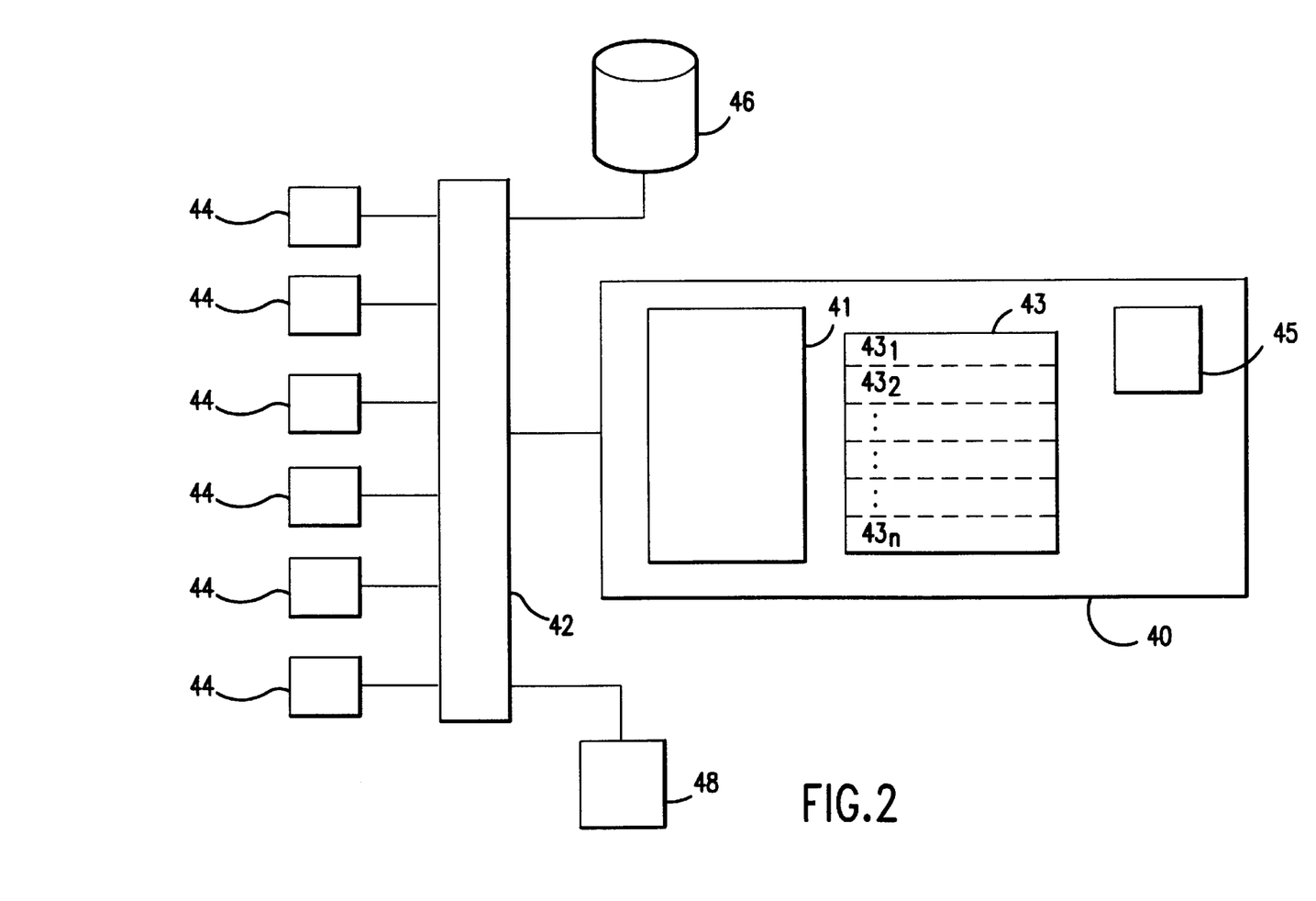
FIG. 2 is a block diagram of an interconnection system of the distributed processor system shown in FIG. 1.

FIG. 2 is a block diagram of the interconnection system 16 of FIG. 1. As shown in FIG. 2, the interconnection system 16 includes a memory 40 that communicates with threads 44 via an interface 42. A storage unit 46 and an input/output (I/O) device 48 are also connected to the interface 42. The memory unit 40 includes a storage area 41 for storing executable programs, a data storage area 43 for storing data, and a condition variable module 45.

During operation of the multiprocessing system 10, to execute several processes $P_1$–$P_n$, each process $P_i$ will be assigned to one of the threads 44. The executable code for these processes is stored in the storage area 43. The storage area 43 also contains the data on which the processes will operate. The storage area 43 may be logically divided into separate storage areas $43_i$–$43_n$ for the storage of data structures, as shown in FIG. 2. During execution of the processes $P_1$–$P_N$, it may be desirable to synchronize access to various system resources, such as the data storage area 43, the data storage device 46 and the I/O device 48, for example. Thus, only one, or optionally a limited number of threads, will have access to these resources at any one time.

Figure 3:
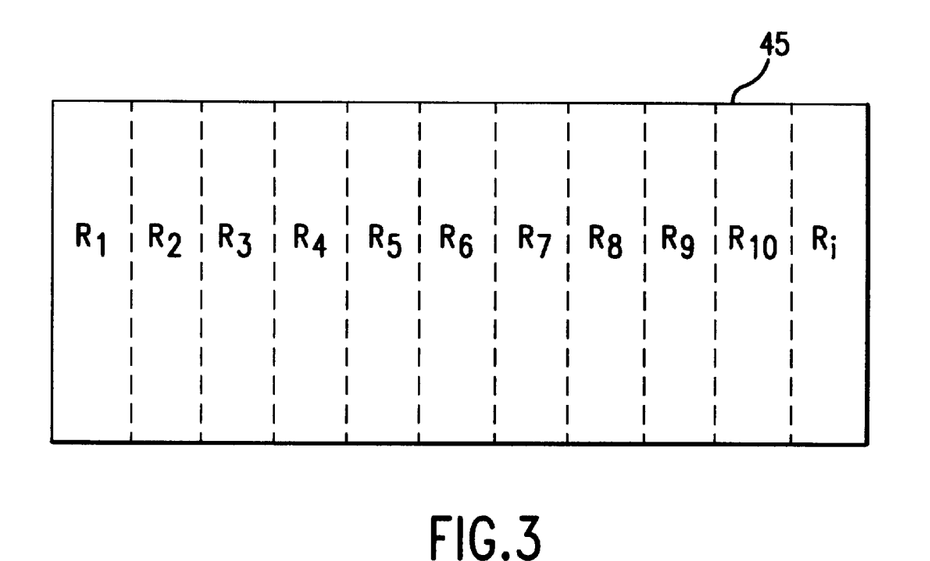
FIG. 3 is a logical illustration of a condition variable module of the distributed processor system shown in FIG. 1.

FIG. 3 is a logical illustration of the condition variable module 45. The condition variable module 45 contains one record $R_i$. Each record $R_i$ is made up of one condition variable. Each of the condition variables is accessible to any of the threads 44.

Figure 4:
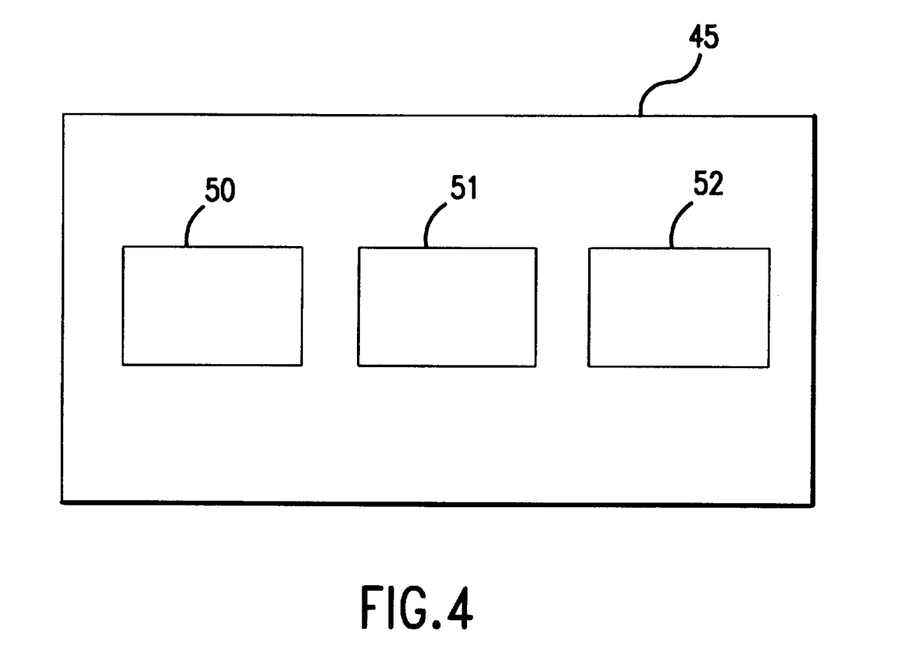
FIG. 4 is a block diagram of each element of the condition variable module shown in FIG. 3.

FIG. 4 is a block diagram of the each element of the condition variable module 45. Each element $R_i$ of condition variable module 45 contains a semaphore 50, a signal counter 51 and a waited counter 52. The waited counter 52 is incremented or decremented to show the number of waited threads 44. The semaphore 50 is waited or signaled by the threads 44 to synchronize the processing each other. The signal counter 51 shows the number of signals issued by the thread 44.

A condition variable is similar in some respects to a semaphore. Whereas a semaphore allows processes, or threads, to synchronize by controlling their access to data, a condition variable allows threads to synchronize on the value of the data. Cooperating threads wait until data reaches some particular state or until a particular event occurs. Thus, a condition variable is a synchronization object that allows a thread to become locked, until it is unlocked by some event. The unlocking can occur simultaneously, or as a result of either a time-out or some other thread performing a signaling operation on the condition variable. In use, condition variables are always associated with a mutual exclusion (mutex). A thread is a single sequential flow of control in a process. A thread may be currently processing or may be waited (i.e., its processing is suspended). A mutex is a synchronization object used to allow multiple threads to serialize their access to shared data. A mutex provides mutual exclusion such that a thread that has locked a mutex becomes the owner, and remains the owner, until the same thread unlocks the mutex.

Waited threads can wait until a given event, such as a signal semaphore being sent to the thread or being broadcast to all threads, or the waited threads can wait an indefinite time. Alternately, waited threads can wait until receipt of the semaphore (signal or broadcast) or until the occurrence of a time-out. If a time-out wakes a waited thread before the semaphore is received, the semaphore counter 50 shows 1 available count. This means that the next thread cannot wait correctly. This is shown in FIG. 5 and described in greater detail below.

To implement the condition variable, the memory unit 40 shown in FIG. 2 receives and issues several condition variables. The procedure "Initialize" initializes and obtains a condition variable. The procedure "CondWait" releases a mutex and waits for a signal to the condition variable. This sequence is processed without any concurrent-procedure processing related to this by any other threads. In other words, the condition variable "CondWait" is processed atomically. When a condition variable is signaled or broadcasted, one or all of the waited threads within the condition variable wake up and obtain the mutex. The procedure "CondWaitTimed " is the same as "CondWait", except it has an additional time-out value argument. If no processing happens during the time interval specified by the time-out, the thread automatically returns from the waited state. The condition variable "CondSignal" signals the condition variable. The condition variable "CondBroadcast" broadcasts the condition variable. Finally, the condition variable "CondTerminate" terminates the condition variable. Use of the condition variables will be described later.

Figure 5:
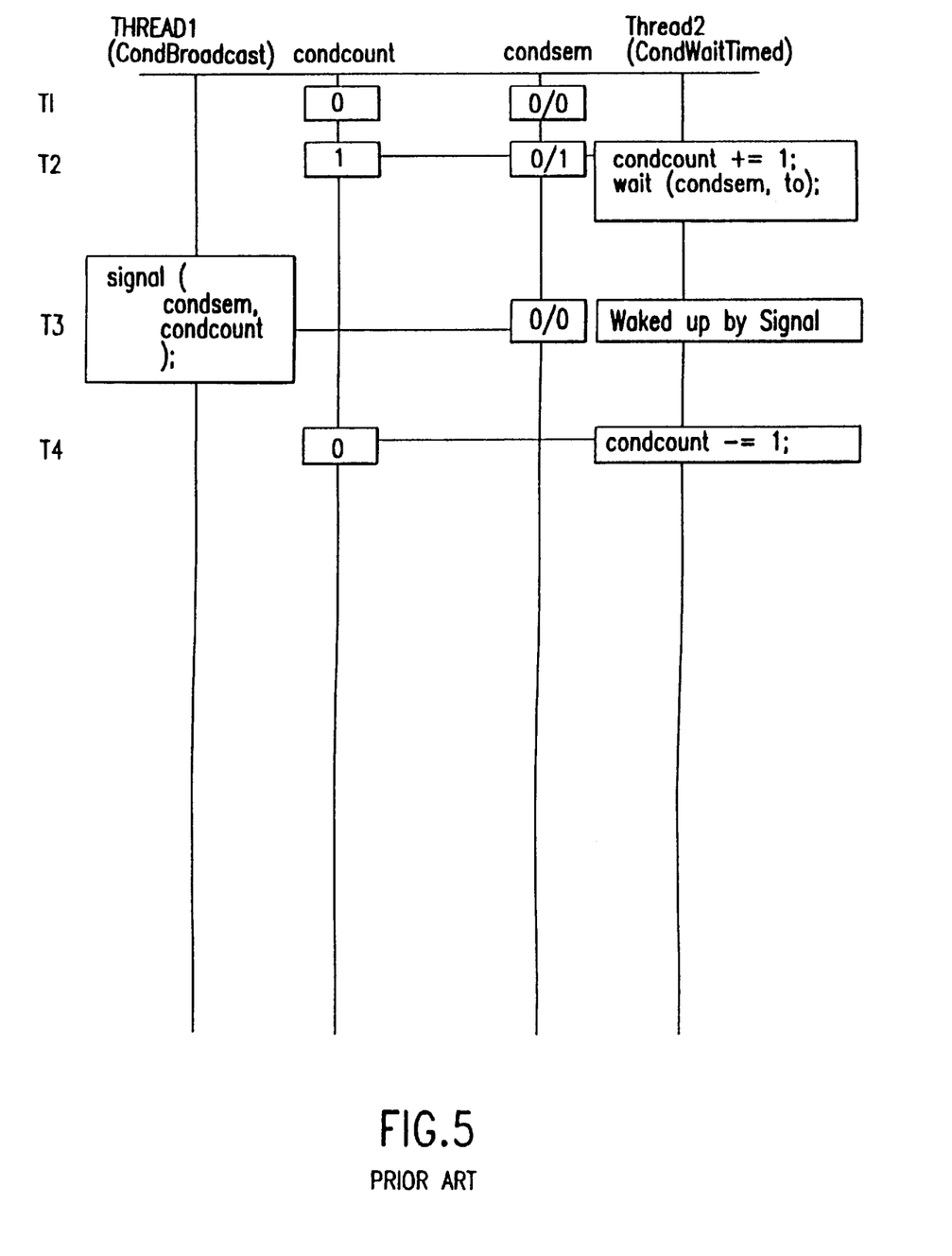
FIG. 5 is a timing diagram for a computer system.

FIG. 5 is a timing chart showing the usual implementation of a wait and broadcast signal in a computer system without a signal counter. Thread 1 (CondBroadcast) and thread 2 (CondWaitTimed) are being processed. At time T1, the initial conditions are no threads waited and counts at zero, as shown in the corresponding waited counter 52 and the semaphore counter 50. At time T2, thread 2 becomes waited and the semaphore counter 50 is incremented by one. Thread 2 acquires the wait condition variable and waits on a signal semaphore or a time-out to wake up. The waited counter 52 is set to one. At time T3, the thread 1 sends a signal semaphore that wakes up thread 2 and then thread 1 becomes waited. The semaphore counter 50 is then reset to zero. At time T4, the thread 2 decrements the waited counter 52 by one. As shown in this timing chart, thread 2 is woken up by the signal semaphore from thread 1.

Figure 6:
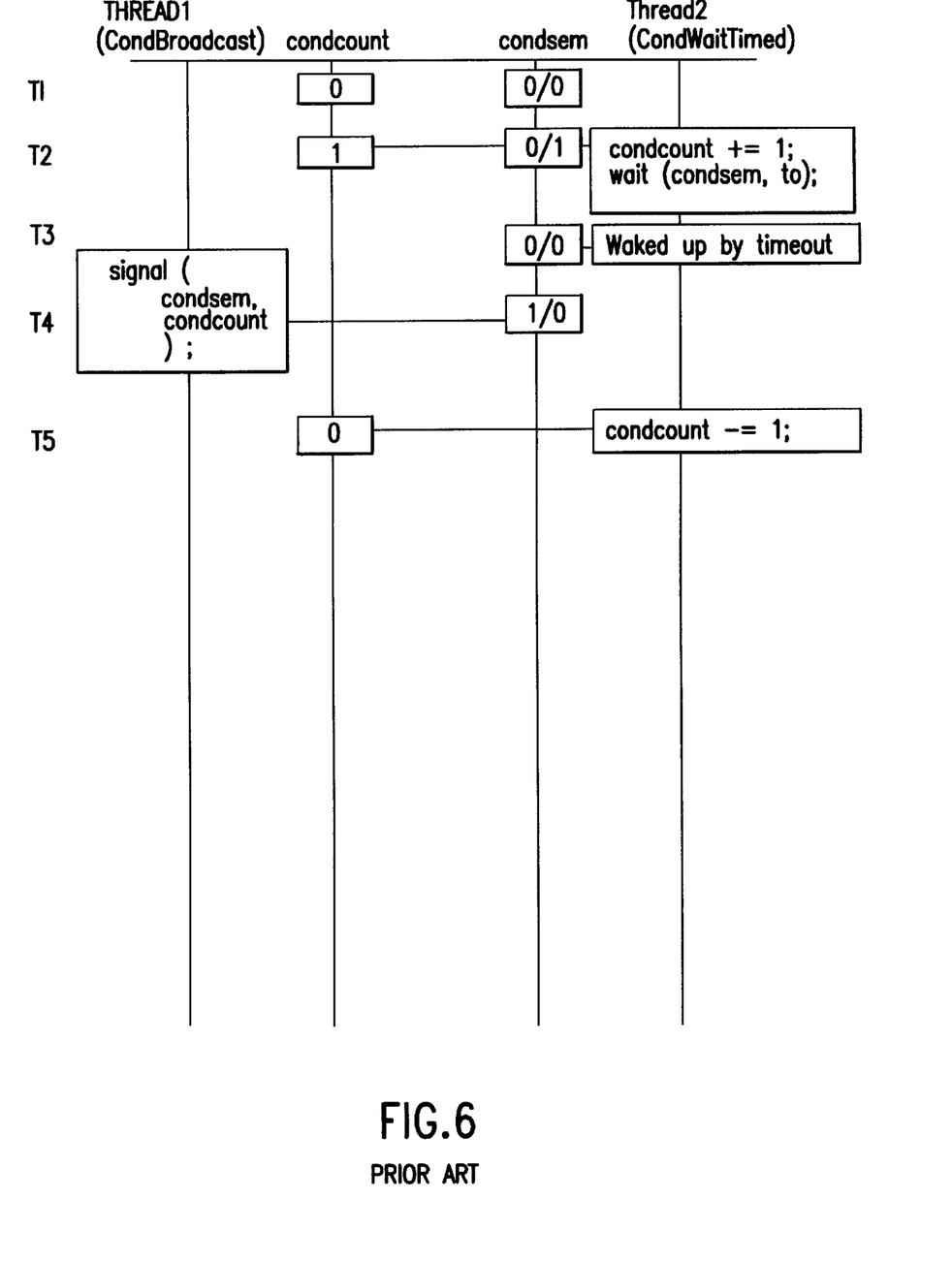
FIG. 6 is a timing diagram for a computer system when a time-out has occured.
Figure 7:
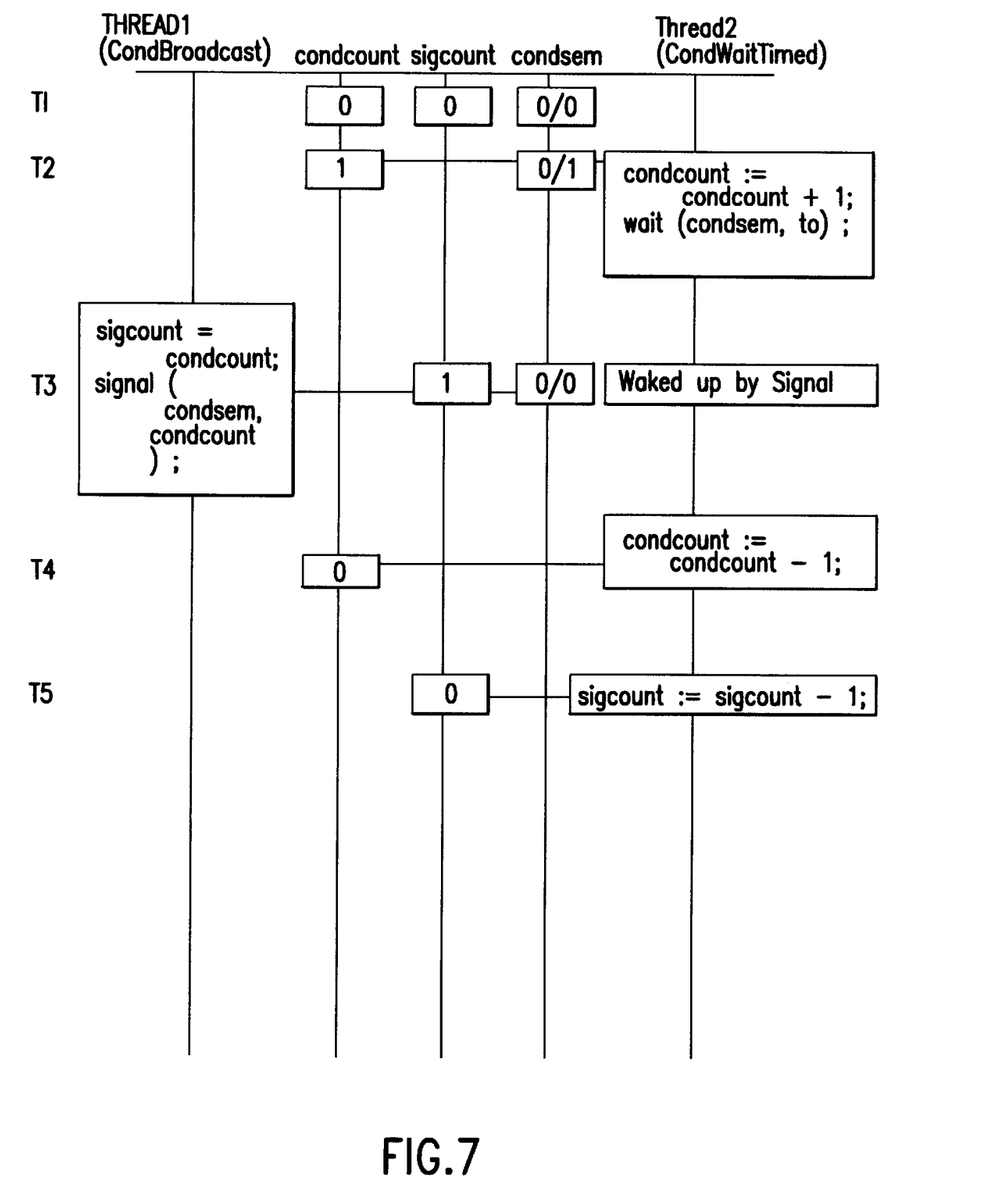
FIG. 7 is a timing diagram for a computer system using a signal counter.

FIG. 6 shows the same events as in FIG. 5 except that the time-out has occured. At time T1, thread 1 and thread 2 are processing and no threads are waited. Thus the waited counter 52 is set at zero and the semaphore counter 50 is set at zero. At time T2, thread 2 becomes waited, causing the waited counter 52 to be incremented by one. Thread 2 then waits on a wait semaphore signal or a time-out. At time T3, thread 2 is woken up by a time-out. At time T4, thread 1 sends a signal semaphore to wake up thread 2, and sets the semaphore counter 50 to one. However, because thread 2 had woken up by the time-out, the signal semaphore from the thread 1 also attempts to wake up thread 2, resulting in an incorrect number of waited threads being indicated in the semaphore counter 50. At time T5, thread 2 sends a signal to decrement the waited counter 52 by one. Thus, the next "CondWait" condition variable cannot indicate a correct number of waited threads. FIG. 7 is a timing chart that shows the processing of threads 1 and 2 with the signal counter 51 added. In FIG. 7, processing follows the normal routine in that thread 2 is woken up by a signal semaphore from the thread 1. Starting at time T1, the system is set with its conditions initialized such that the waited counter 52 and the semaphore counter 50 are both set to zero. In addition, the signal counter 51 is set to zero. At time T2, thread 2 becomes waited and the semaphore counter 50 is incremented by one. Thread 2 acquires the wait condition variable and waits on a signal semaphore or a time-out to wake up. The waited counter 50 is set to one. As in the case shown in FIG. 5, the waited thread 2 is woken up by a signal semaphore from the thread 1 at time T3, before the time-out can be activated. Also at time T3, thread 1 becomes waited. At time T4, the waited counter is decremented by 1. At time T5 the signal counter is decremented by 1. Thus, the addition of the signal counter 51 does not affect the normal execution of processing.

Figure 8:
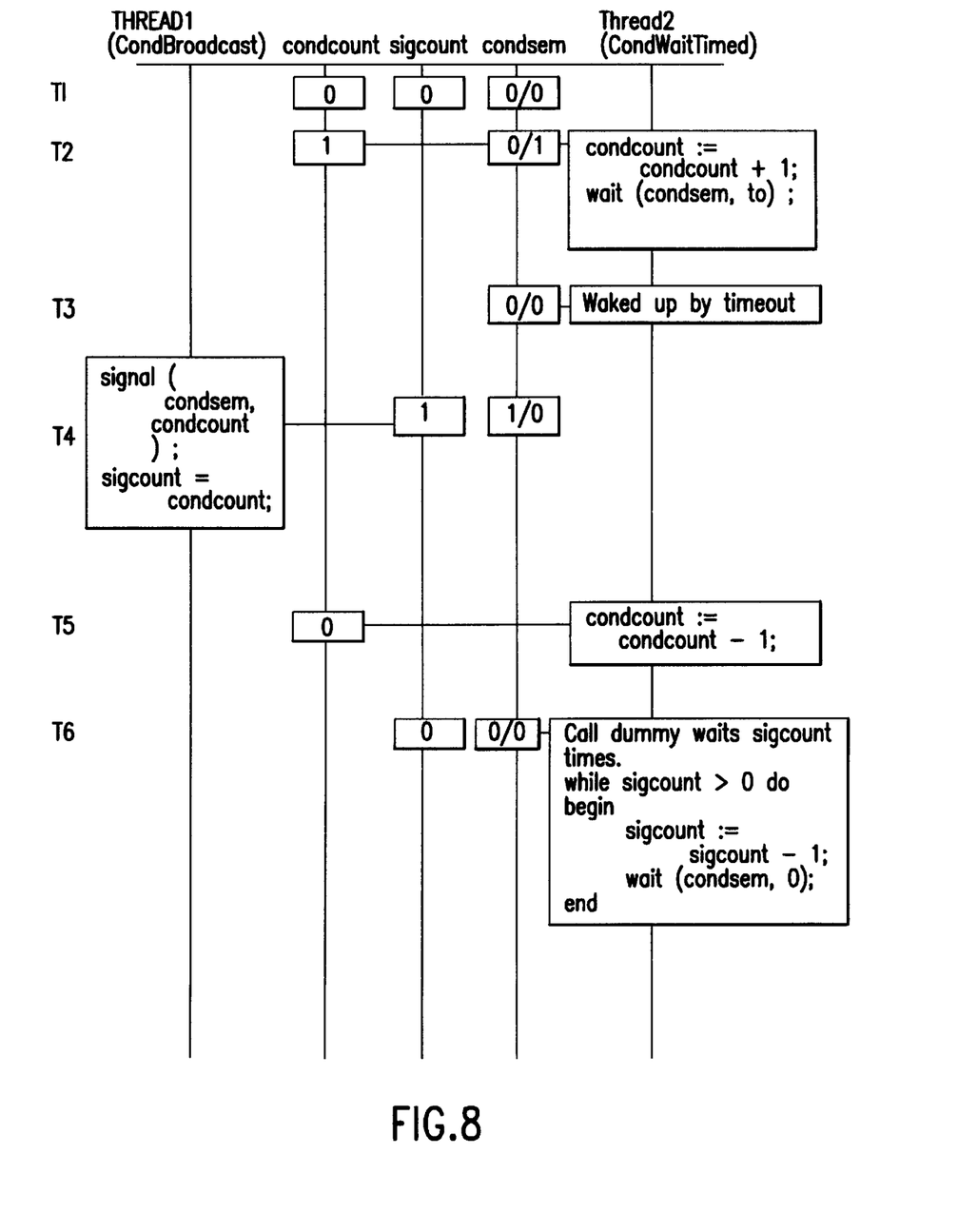
FIG. 8 is a timing diagram for a computer system with a signal counter when time-out has occurred.

FIG. 8 shows the processing of threads 1 and 2 according to the invention when the time-out has occured to wake up the thread 2. The case is similar to that shown in FIG. 6, except that the signal counter 51 is added. At time T1, the system is initialized with the waited, signaled and semaphore counters 50–52 set to zero. At time T2, the thread 2 encounters a condition that requires it to wait or suspend processing. Accordingly, the thread 2 acquires the "CondWaitTimed", waiting for either a signal semaphore or a time-out to wake up. Thus, at time T2, the waited counter 52 is set to 1 to show one thread waited in the semaphore 50.

At time T3, the thread 2 is woken up by the time-out and no waited thread exists in the semaphore 50. At time T4, the signal semaphore is broadcast. Although the thread 2 has already woken up, the signal semaphore also attempts to wake up the thread 2. The signal counter 51 is set to 1 due to the signal semaphore and the available counts in the semaphore counter 50 is incremented by 1. The semaphore counter 50 thus cannot represent the correct number of waited threads.

At time T5, the waited counter 52 is decremented by 1 in response to the time-out that occurred at time T3. The waited counter 52 thus becomes zero and the signal counter 51 (still set at 1) represents the exceeded number of signals. Thus, the semaphore counter 50 status can be corrected using the signal value.

At time T6, dummy processing is initiated. The thread 2 waits a "signaled" number of times based on the value of the signal counter 51. The available counts in the semaphore counter 50 is thus set to zero. Thus, the addition of the signal counter 51 can provide correction of the semaphore status. That is, the signal counter 51 can reset the semaphore counter 50 to zero when all threads are woken up, even when one or more threads are woken up by a time-out.

Figure 9A:
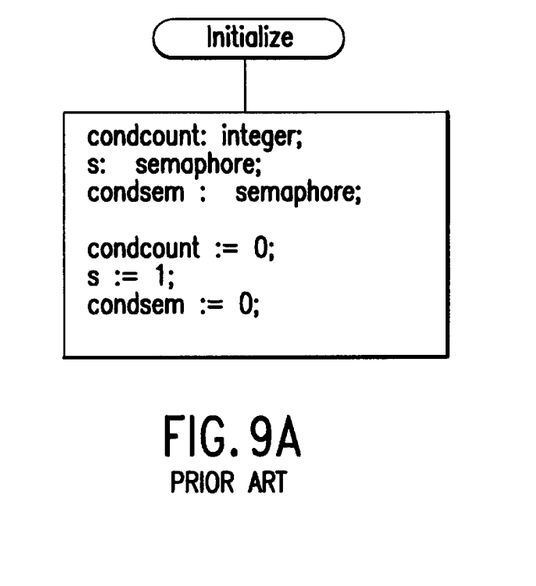
FIGS. 9A–9C are flow charts showing the implementation of semaphores in a computer system without a signal counter.
Figure 9B:
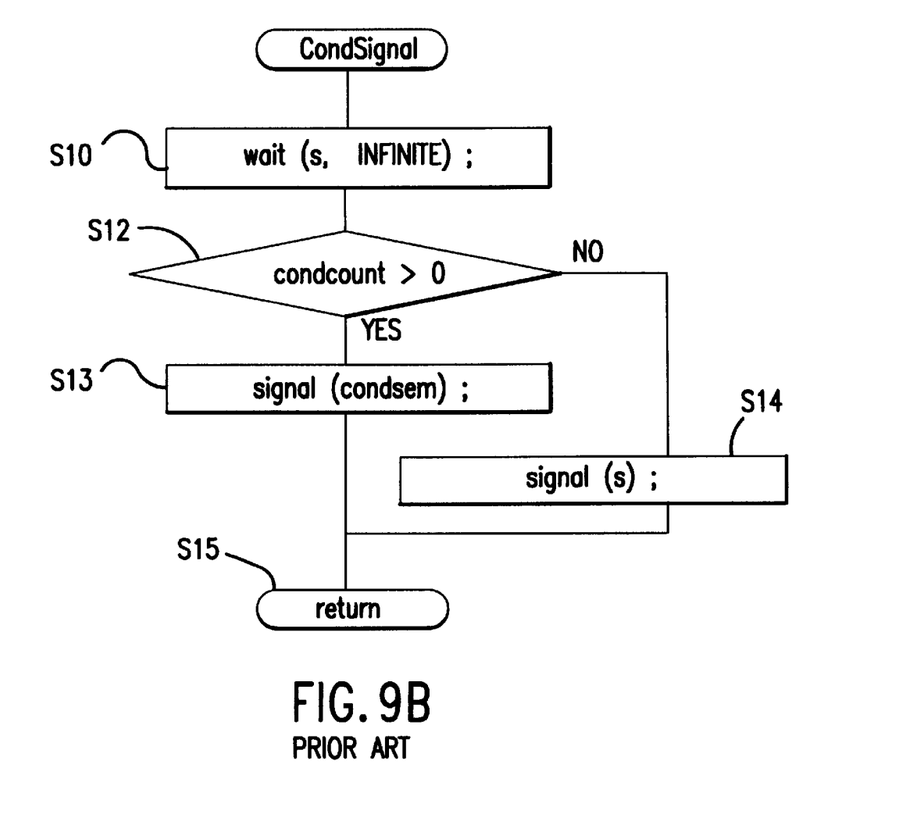
Figure 9C:
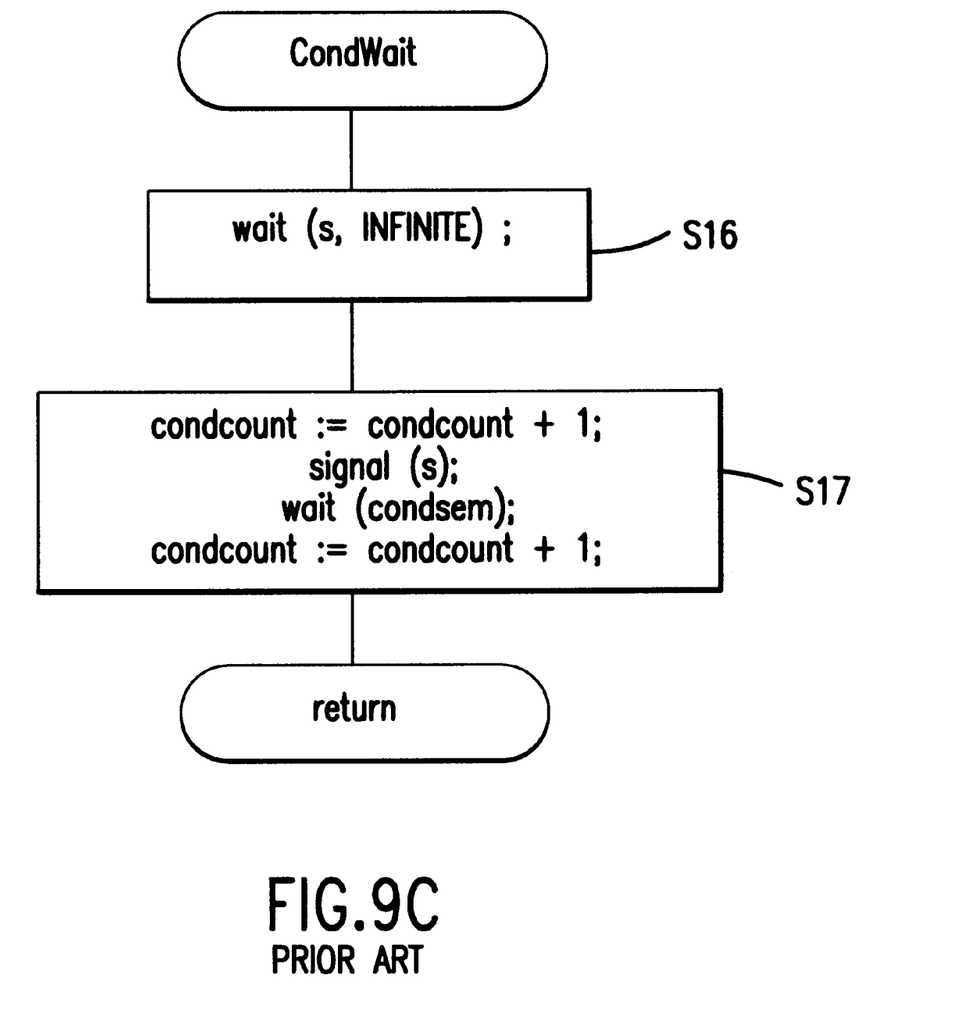

FIGS. 9A–9C show the conventional system that does not use the system and method of this invention. FIG. 9A shows a conventional implementation for initializing the computer system 10 that does not use the signal counter 51. To initialize the computer system 10, the "CondCount" semaphore takes up an integer value and the semaphore counter 50 is set to 1.

FIG. 9B shows the process for processing the "CondSignal" semaphore. In step S10, the thread 1 stops processing and waits for the arrival of the signal semaphore or for an infinite time. The process then moves to step S12.

In step S12, the memory unit 40 checks the semaphore counter 50. If the semaphore counter 50 has a value greater than zero, the process moves to step S13. Otherwise, the process jumps to step S14. In step S13, the semaphore counter is decremented by 1. The process then jumps to step S15. In step S14, the thread 1 sends the signal semaphore to wake up the thread 2. The process then continues to step S15, where control returns to the main routine.

FIG. 9C shows the subroutine for processing the "Cond-Wait" condition variable in a system without a signal counter. In step S16, the thread 2 acquires the "CondWait" condition variable and interrupts processing, waiting on receipt of a signal semaphore. The process then moves to step S17. In step S17, the semaphore counter is incremented by one. Processing then returns to the main routine.

Figure 10A:
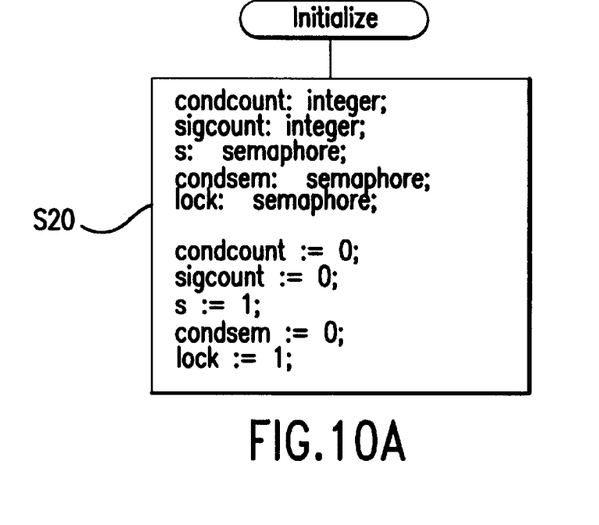
FIGS. 10A–10c are flow charts showing implementation of a condition variable in a computer system with a signal counter.
Figure 10B:
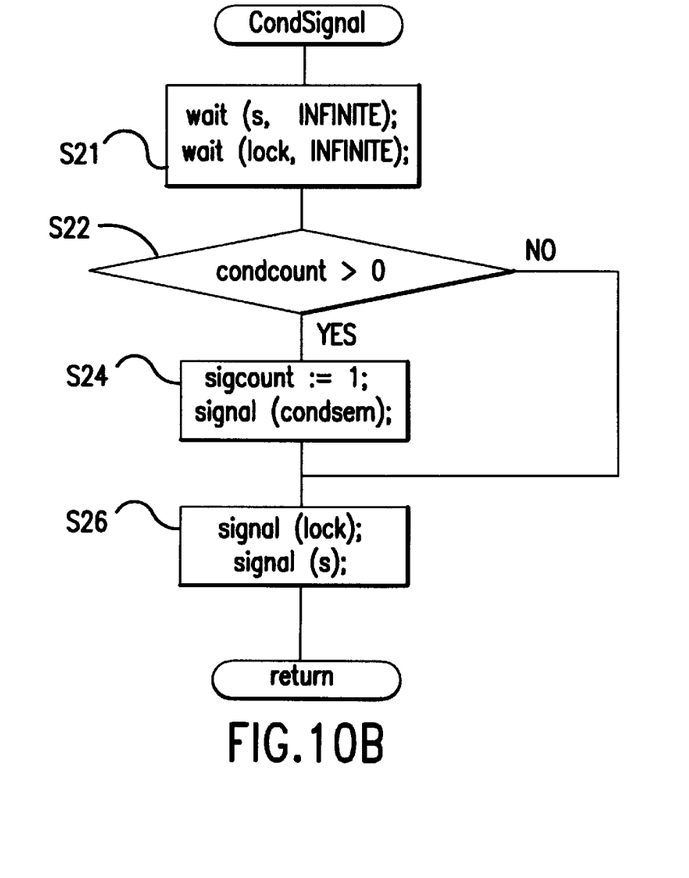
Figure 10C:
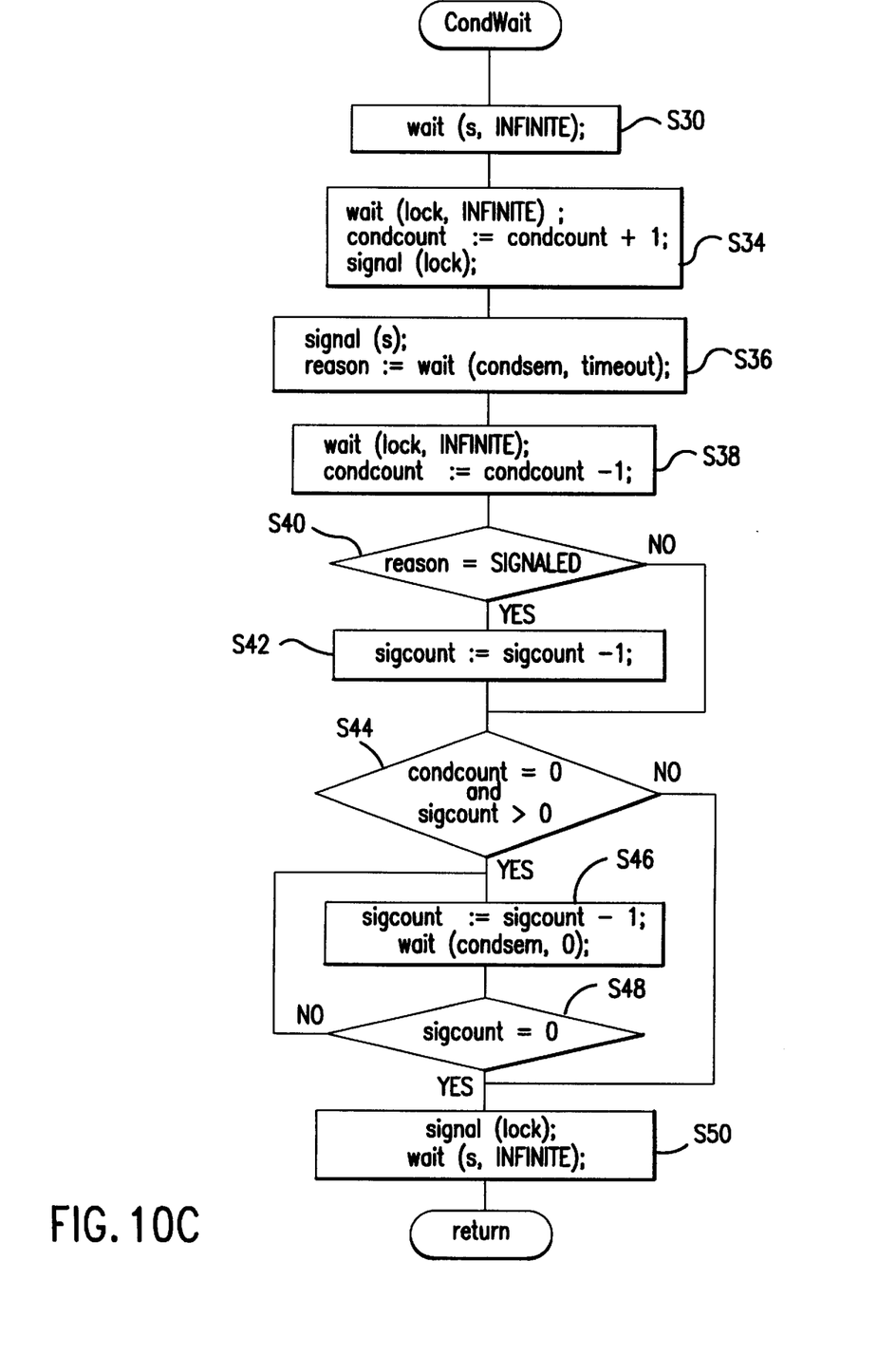

FIGS. 10A–10C show the method of this invention. FIG. 10A shows the system initialization, but with the addition of the signal counter 51. In step S20, the semaphore counter 50 and the signal counter 51 are set to zero. The semaphore counter is then decremented by 1.

FIG. 10B shows the subroutine for processing the "Cond-Signal" condition variable. In step S21, the thread 1 encounters an event that require "waiting" the processing. The thread 2 acquires the "CondWait" condition variable and waits for a signal semaphore to wake up. The process then moves to step S22. In step S22, the memory unit 40 checks the semaphore counter 50. If the semaphore counter 50 is set to a value greater than zero, the process moves to step S24. Otherwise the process jumps directly to step S26.

In step S24, the signal counter is incremented by 1, and the thread 2 establishes a lock. The lock guarantees the first value, since if another thread reads or rewrites the data, the first value might change. The process then moves to step S26. In step S26, the signal semaphore is sent. The process then returns to the main routine.

FIG. 10C shows the subroutine for processing using the "CondWait" condition variable. In step S30, thread 2 waits on processing, acquires the "CondWait" condition variable and waits for a semaphore to wake up. The process then moves to step S34.

In step S34, the thread 2 establishes a lock and the semaphore counter 50 is incremented to 1. The process then moves to step S36.

In step S36, the thread 2 acquires the "CondWaitTimed" condition variable. Thus, the thread 2 will now wait on further processing until the occurrence of a signal semaphore or a time-out, whichever is first. The process then moves to step S38. In step S38, a lock is established, preventing other threads from gaining access to the "Cond-WaitTimed" condition variable. The semaphore counter 50 is then decremented by 1. The process then moves to step S40.

In step S40, the thread 2 is woken up and the memory unit 40 queries if the thread was woken up in response to a signal semaphore. If the thread was woken up in response to a signal semaphore, the process moves to step S42. Otherwise the process jumps directly to step S44.

In step S42, the signal counter 51 is decremented by 1. The process then moves to step S44. In step S44, the memory unit 40 determines if the semaphore counter 50 is set to zero and the signal counter 51 is greater than zero. If both conditions are met, the process moves to step S46. Otherwise, the process jumps to step S50.

In step S46, a dummy wait signal is processed, causing the signal counter 51 to decrement by 1. The process then moves to step S48. In step S48, the memory unit 40 determines if the signal counter 51 is set to zero. If the signal counter 51 is set to zero, the process moves to step S50. Otherwise, the process returns to step S46.

In step S50, the thread 2 releases the lock on the "Cond-WaitTimed" condition variable. The process then returns to the main processing routine.

In the illustrated embodiment, suitably programmed general purpose computers control the data processing. However, the processing functions could also be implemented using a single purpose integrated circuit (e.g., ASIC) having a main or central processor section for overall, system-level control, and separate circuits dedicated to performing very specific computation, functional, and other processes under control of the central processor section. The processing can also be implemented using separate dedicated or programmable integrated electronic circuits or devices (e.g., hard wired electronic or logic devices including PALs, PLAs, FPGAs and PLDs). In general, any device or assembly of devices on which a finite state machine capable of implementing the flowchart of FIGS. 10A–10C can be used to control data processing.

The invention has been described with reference to the preferred embodiments thereof, which are illustrative and not limiting. Various changes may be made without departing from the spirit and scope of the invention as defined in the following claims.

What is claimed is:

1. A computer system, comprising:

a semaphore that blocks processing of a thread, the thread waiting until one of a signal issued from another thread or a time-out condition occurs;

a wait counter that counts a number of waited threads;

means for waking up a waited thread based on a time-out condition of the waited thread and for decrementing the wait counter;

a signal counter that counts a signaled number of waited threads to be woken up in response to a wake up signal;

means for waking up the signaled number of waited threads based on no antecedence and for decrementing the wait counter and the signal counter;

means for mutually locking the thread from access to the wait counter and the signal counter;

means for determining if the signaled number exceeds zero and the waited number is zero; and means for adjusting semaphore status by generating a number of dummy waited threads equal to the signaled number when the signaled number exceeds zero and the waited number is zero.

2. The apparatus of claim 1, wherein the means for mutually locking are binary semaphores.

3. The apparatus of claim 1, wherein the means for mutually locking are mutex locks.

4. The apparatus of claim 1, wherein the signal is a single signal.

5. The apparatus of claim 1, wherein the signal is a broadcast signal.

* * * * *